April 25, 1939.　　　T. H. JACOB　　　2,155,939
VEHICLE AXLE
Filed Sept. 24, 1937　　　2 Sheets-Sheet 1

INVENTOR
THOMAS H. JACOB
BY
ATTORNEYS

April 25, 1939.  T. H. JACOB  2,155,939
VEHICLE AXLE
Filed Sept. 24, 1937   2 Sheets-Sheet 2

INVENTOR
THOMAS H. JACOB

BY

ATTORNEYS

Patented Apr. 25, 1939

2,155,939

UNITED STATES PATENT OFFICE 2,155,939

VEHICLE AXLE

Thomas H. Jacob, Wausau, Wis.

Application September 24, 1937, Serial No. 165,517

2 Claims. (Cl. 267—19)

This invention appertains to vehicle axles, and more particularly to axles especially adaptable for use on trailers.

One of the primary objects of my present invention is to provide an axle in which each one of the wheels will be given a crank (knee) action independent of the other, whereby to insure the proper carrying of the load incident to travel over a roadway.

Another salient object of my invention is to provide a double-acting cantilever spring for each wheel so that the desired resilient support will be had for effectively carrying a heavy load.

A further and important object of my invention is to provide means whereby the levers or cranks employed for supporting the wheels at the axle ends can be adjusted on the axle, whereby one wheel can be raised or lowered relative to the other, and to the vehicle body, so as to take care of an extra amount of weight on one side of the body, or whereby both wheels can be adjusted for raising or lowering the entire body as the case may be in order that the body can be carried level where the hitch or drawing vehicle is not at the proper height.

A still further object of my invention is to provide a novel axle of the above character, which will be durable and efficient in use, one that will be simple and easy to manufacture, and one which can be placed upon the market at a low cost.

With these and other objects in view, the invention consists in the novel construction, arrangement, and formation of parts, as will be hereinafter more specifically described, claimed, and illustrated in the accompanying drawings, in which drawings:

Figure 1:
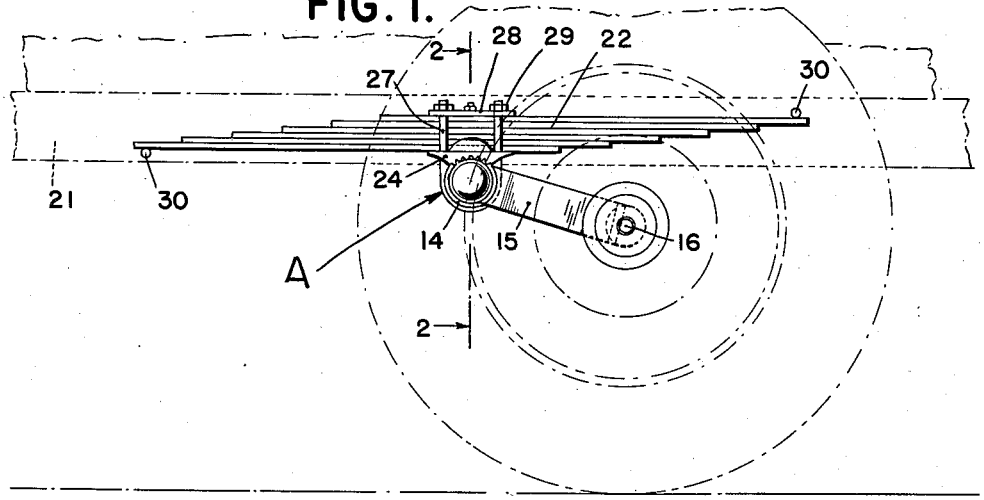
Figure 1 is an end elevation of my novel axle and spring support therefor, the wheel and vehicle body being shown in dotted lines.

Referring to the drawings in detail, wherein similar reference characters designate corresponding parts throughout the several views, the letter A generally indicates the improved axle, which comprises a transversely extending body portion 10, which can be of inverted U shape in cross section. The terminals of the body portion 10 have welded or otherwise secured thereto a depending axle arm 11, which can be of a hollow construction. The outer ends of the axle arms 11 receive the hub spindles 12, and these hub spindles 12 can be rigidly connected to the arms in any desired manner, such as by welding.

Figure 2:
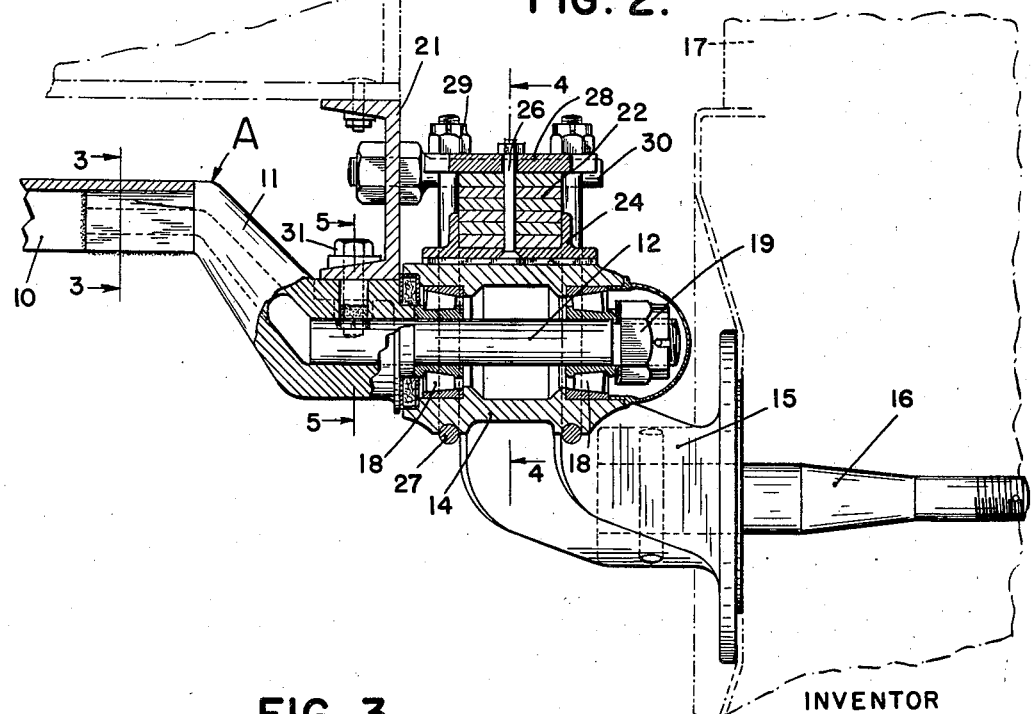
Figure 2 is a detail section taken on the line 2—2 of Figure 1, looking in the direction of the arrows, illustrating the means of mounting a wheel crank or lever on an axle end, and the means for connecting the spring therewith.
Figure 3:
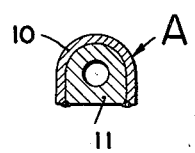
Figure 3 is a detail, transverse section through the axle, taken on the line 3—3 of Figure 2, looking in the direction of the arrows.
Figure 4:
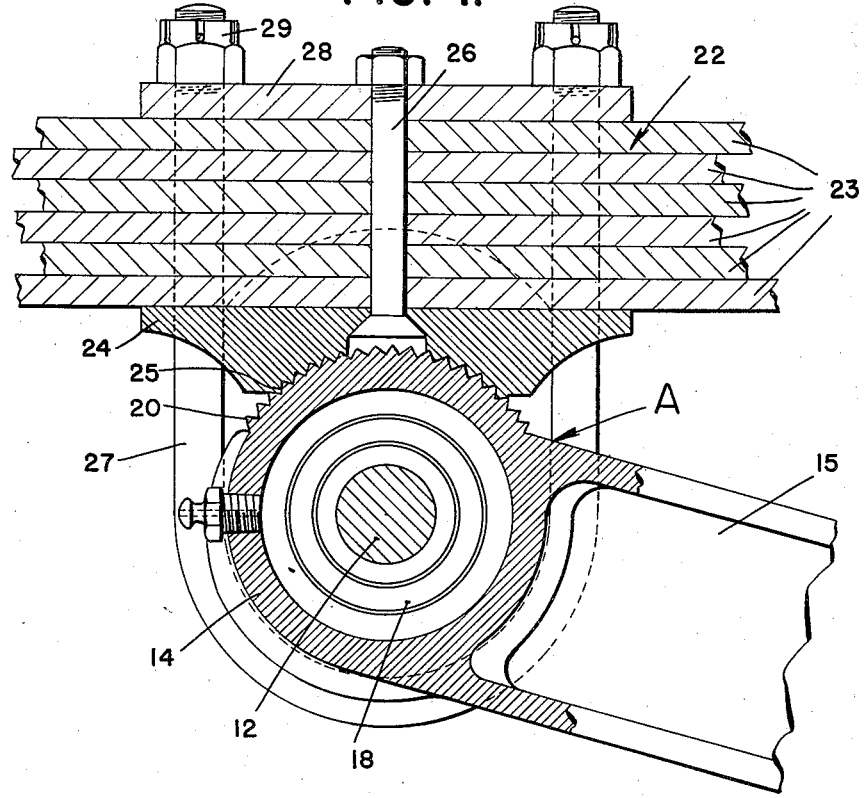
Figure 4 is an enlarged fragmentary detailed section, taken on the line 4—4 of Figure 2, illustrating the means for adjustably connecting the wheel crank or lever on an axle end.
Figure 5:
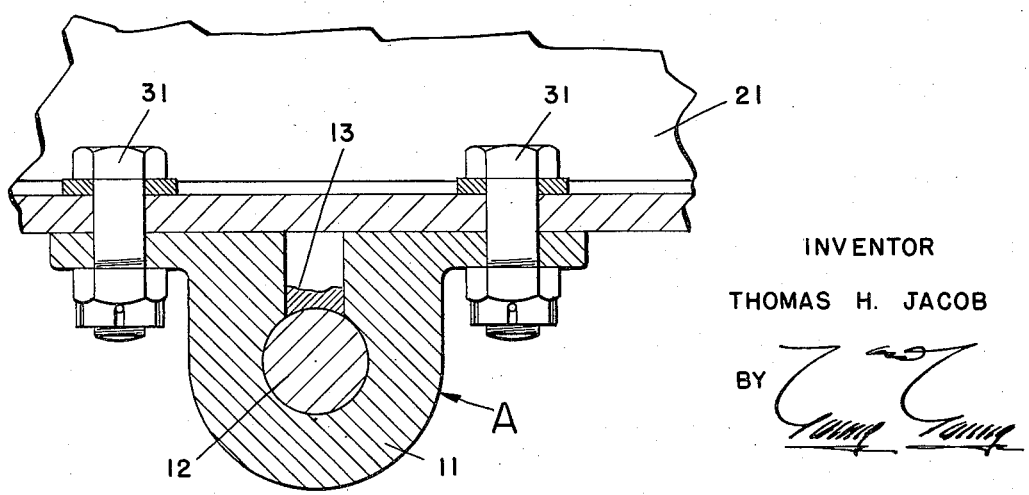
Figure 5 is a detail, transverse section through the axle, illustrating the means for connecting the hub spindle with the body portion of the axle.

In Figures 2 and 4 I have illustrated one method of securing the axle spindles in place. As illustrated, the axle arms are provided with radial holes 13 opening into the bores for the hub spindle. This facilitates the introduction of suitable welding or soldering material into the axle arm, whereby the spindle can be firmly held in place.

Rotatably mounted upon the spindle 12 is a hub 14. This hub 14 has formed thereon the rearwardly extending wheel crank or lever 15. The outer end of each wheel crank or lever 15 carries an outwardly extending wheel spindle 16 on which is mounted in any preferred manner the wheel 17. The wheel 17 can be provided with brake drums and the like, if so desired. Likewise suitable anti-friction bearings are provided between the wheel hub and the wheel spindle. I also prefer to utilize anti-friction bearings 18 between the hub 14 and its spindle 12, and the hub 14 can be held on its spindle against shifting by the use of suitable nuts or the like 19. The upper edge of the hub is serrated or provided with a plurality of teeth 20, for a purpose which will be hereinafter more fully set forth.

Extending above the hub 14, and longitudinally of the body channel iron 21, is the vehicle spring 22. This spring 22 includes a plurality of leaves 23. The leaves at one end of the spring progressively decrease on the under side, and the leaves at the opposite end of the spring progressively decrease in length on the upper side of the spring. The lower face of the spring at its central portion receives a plate or saddle block 24, the lower surface of which is of an arcuate formation for receiving the hub 14. This arcuate surface is serrated or provided with a plurality of teeth 25, which are adapted to mate with the teeth 20 formed on the hub. The saddle block 24 can be rigidly secured to the central portion of the spring 22 by a bolt 26. U-bolts 27 are employed for extending about the hub and for connecting the hub to the spring 22. These bolts 27 can extend through a top plate 28 disposed on top of the spring, and the nuts 29 are threaded on the ends of the U-bolts against the plate 28. Obviously, by tightening the nuts 29, the hub 14 with its teeth 20 can be drawn into intimate locking contact with the saddle block 24 and its teeth 25.

The spring is normally placed under tension, and the opposite ends thereof are confined by laterally extending pins 30, rigidly secured to the channel beam 21. If desired, the ends of the spring can be anchored to the channel beam by the use of suitable shackles, or the like. The channel beams 21 rest directly upon the axle arms 11, and the axle arms are preferably secured to the channel beam by bolts 31.

By referring more particularly to Figure 1 of the drawings, it will be noted that the crank arms or levers 15 carrying the wheels tend to rotate on the hub spindle 12, and that this movement is resisted by the spring 22. This spring is of the type in which both ends thereof are working on the cantilever principle, and thus the spring is enabled to carry as a support a desired heavy load. The spring extends longitudinally of the channel beam 21, and is of less height than the height of the channel beam. Thus, the spring occupies a minimum amount of space.

Where the vehicle body is unevenly loaded, the desired wheel can be raised or lowered by merely loosening the nuts 29 on the U-bolts 27, so that the axle cranks or levers 15 can be rotated on the spindles 12. After the axle levers or cranks 15 have been adjusted, the U-bolts are again tightened. Obviously, the wheel cranks or levers can be adjusted on both sides of the vehicle so as to raise or lower the body of the vehicle. This is important where it is desired to maintain the floor of the vehicle level when the hitch of the drawing vehicle is not at the proper height.

The axle is exceptionally strong, and is extremely light in weight, and can be manufactured and placed upon the market at a low cost.

Changes in details may be made without departing from the spirit or the scope of my invention, but what I claim as new is:

1. In a vehicle, a vehicle body, a transversely extending axle, means rigidly connecting the body with the axle, an outwardly extending spindle on the axle, a wheel crank, a hub rigidly connected with the inner end of the crank and rotatably mounted upon the spindle, a wheel rotatably carried by the outer end of the crank, a spring for connecting the hub with the body, and means adjustably connecting the hub with the spring whereby the position of the crank and wheel can be varied relative to the body.

2. In a vehicle, a vehicle body, a transversely extending axle, means rigidly connecting the body with the axle, an outwardly extending spindle secured to the axle, a wheel crank, a hub rotatably mounted upon the spindle forming a part of the crank, a vehicle wheel rotatably carried by the crank, said hub having a plurality of locking teeth thereon, a spring, a spindle block carried by the lower end of the spring having a plurality of mating teeth for the teeth on the hub, and means connecting the spring with the hub whereby to normally hold the teeth of the spindle block and the teeth of the hub in contact.

THOMAS H. JACOB.